(12) United States Patent
Desbrun et al.

(10) Patent No.: US 6,573,897 B1
(45) Date of Patent: Jun. 3, 2003

(54) REAL-TIME, INTERACTIVE ANIMATION OF DEFORMABLE TWO- AND THREE-DIMENSIONAL OBJECTS

(75) Inventors: Mathieu Desbrun, Pasadena, CA (US); Peter Schroeder, Pasadena, CA (US); Mark Meyer, Pasadena, CA (US); Alan H. Barr, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/569,352

(22) Filed: May 11, 2000

(65) Prior Publication Data (65)

Related U.S. Application Data

(60) Provisional application No. 60/181,381, filed on Feb. 9, 2000.

(51) Int. Cl.$^7$ ............................................... G06T 16/00
(52) U.S. Cl. ...................................................... 345/473
(58) Field of Search ................................. 345/473, 474, 345/475, 418

(56) References Cited

PUBLICATIONS

Desbrun, Mathieu et al., *Interactive Animation of Structured Deformable Objects*, (8 pages), published Jun. 1999 in Graphics Interface 1999, Kingston, Canada.

Kang, Young–Min et al., *Real–time Animation Technique for Flexible and Thin Objects*, (8 pages), published Feb. 2000 in Proc. of Winter School of Computer Graphics (WSCG) 2000, pp. 322–329, Plzen, Czechoslovakia.

Meyer, Mark et al., *Interactive Animation of Cloth–like Objects in Virtual Reality*, published May 2001 in the Journal of Visualization and Computer Animation, vol. 12, Issue 1, May 2001, pp. 1–12.

*Primary Examiner*—Cliff N. Vo
(74) *Attorney, Agent, or Firm*—Howrey Simon Arnold & White, LLP

(57) ABSTRACT

A method of updating in real-time the locations and velocities of mass points of a two- or three-dimensional object represented by a mass-spring system. A modified implicit Euler integration scheme is employed to determine the updated locations and velocities. In an optional post-integration step, the updated locations are corrected to preserve angular momentum. A processor readable medium and a network server each tangibly embodying the method are also provided. A system comprising a processor in combination with the medium, and a system comprising the server in combination with a client for accessing the server over a computer network, are also provided.

32 Claims, 10 Drawing Sheets

REAL-TIME, INTERACTIVE ANIMATION OF DEFORMABLE TWO- AND THREE-DIMENSIONAL OBJECTS

This application claims the benefit of U.S. Provisional Application No. 60/181,381, filed Feb. 9, 2000, which is hereby fully incorporated by reference herein as though set forth in full.

The U.S. Government has certain rights in this invention pursuant to Grant Numbers ACI-9721345 and EIA-9871235 awarded by the National Science Foundation and Grant No. W-7405-ENG-48 awarded by the Department of Energy.

BACKGROUND OF THE INVENTION

1. Field of the Invention

This invention generally relates to real-time, interactive animation of objects, and, more specifically, to real-time, interactive animation of two- and three-dimensional deformable objects.

2. Background

A mass-spring system is a useful way to model a deformable two- or three-dimensional body in an environment in which the body is subject to external forces. According to a technique known as explicit Euler integration, the forces on the mass points of the object at the beginning of a time period $\Delta t$ are used to estimate the velocities and locations of the mass points at the end of the time period $\Delta t$. The explicit Euler integration step may be used to estimate the locations of the mass points of the object over successive time periods. Deformation of the object resulting from the external forces can be animated by displaying the object as represented by these updated mass points over successive time periods.

A problem with the explicit Euler technique, however, is that, in order to achieve stability, the duration of the time period over which the explicit integration is performed should be inversely proportional to the stiffness of the mass-spring system used to model the object. Since most real-world objects will require relatively stiff springs for modeling purposes, the duration of the time period over which the integration must be performed will be relatively small. The smaller the time period over which the integration is performed, the slower the resulting animation of the object. The result is that, using the explicit Euler integration technique, the majority of real-world objects cannot be animated in real-time. Moreover, all known techniques which have been attempted to overcome this problem yield results which lack realism.

For further background on the subject, the reader is referred to "Interactive animation of structured deformable objects," Mathieu Desbrun et al., Graphics Interface '99 Proceedings, pp. 1–8, June, 1999, Kingston, Ontario; "Interactive Animation of Cloth-like Objects for Virtual Reality," Mathieu Desbrun et al., published in "Cloth Modeling and Animation," A. K Peters, Ltd., Publisher, Donald H. House & David E. Breen, Editors, Kathryn Maier, Associate Editor, Apr. 30, 2000; and "Interactive Animation of Cloth-like Objects in Virtual Reality," Mark Meyer et al., submitted for publication in Journal of Visualization and Computer Graphics. All of these papers or publications are hereby incorporated by reference herein as through set forth in full.

Accordingly, there is a need for a system of and method for animating two- and three-dimensional objects which overcomes one or more disadvantages of the prior art.

There is also a need for a system of and method for animating two- and three-dimensional objects in real-time while maintaining realistic animation quality.

A further need is for a system of and method for animating two- and three-dimensional objects which fulfills any of the foregoing needs, singly or in combination.

SUMMARY OF THE INVENTION

In accordance with the purpose of the invention as broadly described herein, there is provided a method for updating the locations and velocities of the mass points of a two- or three-dimensional object to reflect passage of a time period having a duration $\Delta t$. The object is represented by a mass-spring system comprising a plurality of mass points interconnected with springs. In one embodiment, the method comprises the steps of: performing a modified implicit integration step to determine new locations of the mass points of the object after a time period $\Delta t$, optionally correcting the new locations of the mass points of the object after the time period $\Delta t$ in order to preserve angular momentum, and optionally further correcting the new locations of the mass points of the object after the time period $\Delta t$ to correct for high stiffness or long time step conditions.

In one embodiment, the method further comprises displaying the object as represented by the corrected locations of the mass points, and successively repeating the foregoing steps over at least one successive time period.

In one configuration, the modified implicit integration step comprises the substeps of calculating the internal force on each mass point of the object at the beginning of the time period $\Delta t$ due to the action of springs; adding an artificial viscosity term to each of these internal forces; filtering out high frequencies from the resultant forces; calculating new velocities for each of the mass points of the object using the filtered forces and any external force applied to the mass points; and calculating new positions for each of the mass points of the object from the updated velocities.

In one implementation, the modified implicit integration step is preceded by a precomputation step in which an n×n matrix H is precomputed, where n is the number of mass points in the object. The matrix H is defined such that $H_{ij}$, for $i \neq j$, is equal to $k_{ij}$, where $k_{ij}$ is the spring constant for the spring between the ith and jth mass points of the object, and $H_{ij}$ is equal to $$-\sum_{j \neq i} k_{ij}.$$

This latter term is the negative of the sum of the spring constants for all mass points connected to mass point i with a spring.

Once the matrix H has been precomputed, the matrix W is precomputed in accordance with the following expression:

$$W = \left(I_n - \frac{dt^2}{m}H\right)^{-1}$$

where $I_n$ is the n×n identity matrix, dt is the duration time period over which the implicit integration is being performed, m is the mass of a single mass point, and H is the hessian matrix previously discussed.

The precomputation step in this implementation is next followed by a series of steps in which, for each mass point i, the internal force $F_i$ on the mass point due to the action of springs i is first determined, and then an artificial viscosity term is computed and added to this internal force. This series of steps can be represented by the following pseudo-code:

For each mass point i $F_i=0$

For each mass point j linked to mass point i with a spring $$F_i = F_i + k_{ij}(|x_i - x_j| - l_{ij}^0)\frac{x_i - x_j}{|x_i - x_j|}$$

$F_i=F_i+k_{ij}dt(v_j-v_i)$

In the foregoing, $F_i$ is the force on mass point i due to springs and viscosity, $k_{ij}$ is the spring constant for the spring between mass points i and j, $x_i$ is the vector representing the current location of mass point i, $x_j$ is the vector representing the current location of mass point j, $l_{ij}^0$ is the rest length of the spring between mass points i and j, dt is the duration of the time step over which the implied integration step is being performed, $v_i$ is the current velocity of mass point i, and $v_j$ is the current velocity of mass point j.

This series of steps is then followed in this implementation by a series of steps to filter out high frequencies from the force field determined in the previous series of steps, and to determine updated velocities and locations for each of the object mass points. This series of steps can be represented by the following pseudo-code:

For each mass point i $$F_i^{filtered} = \sum_j F_j W_{ij}$$

$$v_i^{n+1} = v_i^n + [F_i^{filtered} + F_i^{ext}]\frac{dt}{m}$$

$x_i^{new}=x_i+v_i^{n+1}dt$

In the foregoing, $F_j$ is the force on mass point j computed in the previous loop of pseudo-code, $W_{ij}$ is the element of matrix W located at the intersection of the ith row and jth column, $F_i^{ext}$ is the external force exerted on mass point i, m is the mass of a single mass point, $v_i^n$ is the velocity of mass point i at the inception of the time period of duration dt, $x_i$ is the location of mass point i at the inception of the time period of duration dt, $v_i^{n+1}$ is the updated velocity of a mass point, and $x_i^{new}$ is the updated location of the mass point.

The addition of an artificial viscosity term to the internal forces due to springs, filtering of the resultant forces to remove one or more high frequencies, and use of a constant matrix W to perform this high frequency filtering are all independent aspects of the invention which may be present separately or collectively in various embodiments of the invention.

Once the modified implicit integration step has been performed, the next step comprises optionally correcting the updated locations of the mass points in order to preserve angular momentum. In one implementation, this step is performed first by calculating the center of gravity of the object $x_G$ in accordance with the following equation:

$$x_G = \frac{\left(\sum_i x_i\right)}{n},$$

in which n is the number of mass points in the object. Then, the global torque δT created by the filtered force is computed using the following equation:

$$\delta T = \sum_i F_i^{filtered} \otimes x_i.$$

Next, a corrective displacement for each mass point i, $D_i^{corr}$, is computed in accordance with the following equation: $D_i^{coor}=(x_G-x_i)\otimes \delta T$. Finally, the updated location of each mass point, $x_i^{new}$ is corrected in accordance with the following equation:

$$x_i^{new} = x_i^{new} + D_i^{corr}\frac{dt^2}{m}.$$

Finally, an optional correction step is performed to accommodate cases involving high stiffness springs or large time periods. In one implementation, this step is performed by iterating through all or substantially all of the pairs of mass points joined by a spring, and checking to see if the spring length $l_{ij}$ between mass points i and j exceeds the rest length, $l_{ij}^0$, by a predetermined maximum amount such as, for example, 10%. If this condition is present, the two mass points are moved closer together in equal measures until the distance between the two equals the rest length plus the predetermined maximum amount. The only exception to this remedy is if movement of one of the mass points is constrained in some way, such as if it is being held for example. In this case, the unconstrained mass point is moved closer to the constrained mass point until the length between the two is at the predetermined maximum.

In this implementation, this process continues to iterate until one of the following three conditions are present. First, the distance between none of the mass point pairs exceeds the predetermined maximum. Second, the number of iterations equals or exceeds a predetermined maximum number of iterations. Third, a predetermined maximum time limit is equaled or exceeded.

In addition to the foregoing methods, related processor readable media, network accessible servers, and systems in accordance with the subject invention are also provided.

DETAILED DESCRIPTION OF THE PREFERRED EMBODIMENTS

Figure 1:
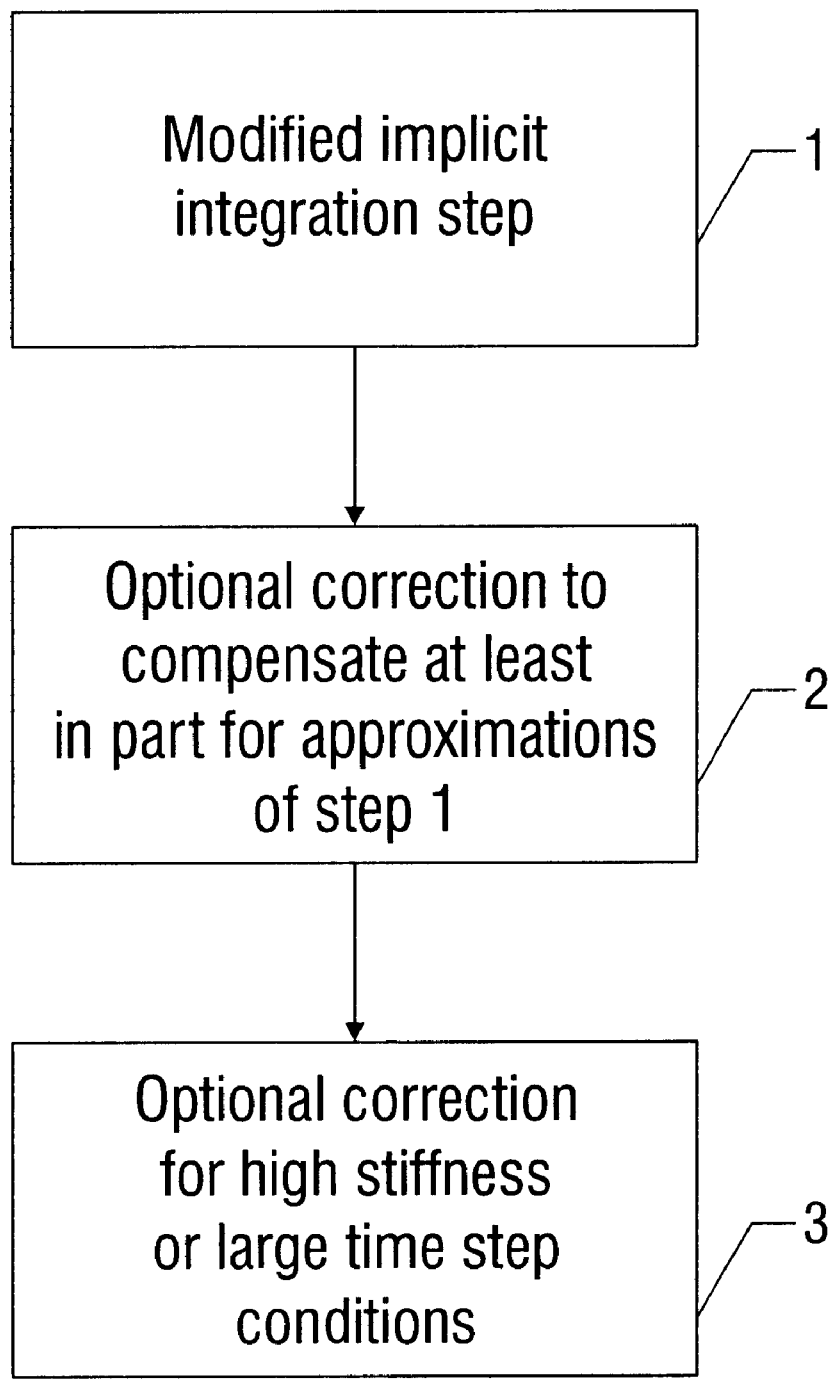
FIG. 1 illustrates one embodiment of a method in accordance with the subject invention.

An embodiment of a method in accordance with the subject invention is illustrated in FIG. 1. The method is for updating the locations and velocities of mass points of an object represented by a mass-spring system in which the mass points are interconnected with springs. The updating is to take account of the passage of a time period having the duration dt. One application of this method is for supporting animation of a two- or three-dimensional object in real-time. In this application, the method is advantageously performed at the inception of each of the time periods of duration $\Delta t$ over which the animation is performed.

In step 1, a modified implicit integration step is performed to determine new locations of the mass points of the object at the conclusion of the time period of duration $\Delta t$. To explain the principles behind this step, the following terminology is adopted:

x is the geometric state of the system, consisting of all of the positions $x_i$ of the mass points: $x=(x_1, x_2, \ldots, x_n)^T$ v is the vector containing all of the velocities: $v=dx/dt$ $F_i$ denotes the internal forces (due to springs and viscosity) acting on a mass point, i, whereas $F_i^{ext}$ will denote external forces such as gravity The superscript index n or lack thereof indicates the time equal to an arbitrary time $t_0$ plus ndt. For instance, $x_i^n$ or $x_i$ both mean $x_i(t_0+ndt)$.

The superscript index n+1 indicates a time equal to $t_0+(n+1)dt$

The backward difference operator $\Delta^{n+1} x$ refers to $x^{n+1}-x^n$ dt and $\Delta t$ are used synonomously The purpose of the modified implicit integration step is to estimate, using a variant of implicit Euler integration, new locations of the mass points of the object, $x_i^{n+1}$, from the previous locations and velocities of these mass points, $x_i^n$ and $v_i^n$, respectively, and also the forces, $F_i^{n+1}$, exerted on these mass points at the end of the time period $\Delta t$. The following equations describe the implicit Euler integration step:

$$v_i^{n+1} = v_i^n + F_i^{n+1} \frac{dt}{m} \quad (1)$$

$$x_i^{n+1} = x_i^n + v_i^{n+1} dt \quad (2)$$

There are three modifications which can be made to the implicit integration process in order to promote computational efficiency. The first two stem from using the following first-order approximation to estimate $F^{n+1}$:

$$F^{n+1} = F^n + \frac{\partial F}{\partial x} \Delta^{n+1} x \quad (3)$$

This approximation avoids the problem, present in the original implicit integration scheme, of having to compute $F^{n+1}$ without knowing the positions $x^{n+1}$ of the mass points at time t+dt. Letting H refer to $$\frac{\partial F}{\partial x},$$

and plugging equation (3) into equations (1) and (2) yields:

$$\Delta^{n+1} v = \left(I - \frac{dt^2}{m} H\right)^{-1} (F^n + dt H v^n) \frac{dt}{m} \quad (4)$$

Comparing equation (4) with equation (1), it can be seen that the term $dtHv^n$ is added to $F^n$, the force on the mass points due to the springs. For a given mass point i, this additional force can be written as $$\sum_j k_{ij} dt(v_j - v_i),$$

$\forall$ j linked to mass point i with a spring. This term represents an artificial viscosity term which is added to the internal force acting on the mass point through springs. It is proportional to the stiffness of the springs to which the mass point is affixed to neighboring mass points, and to the duration dt of the time step over which the implicit integration is to be performed. This is the first modification referred to above.

The second modification involves multiplying the combined force due to springs and artificial viscosity by the matrix:

$$W = \left(I - \frac{dt^2}{m} H\right)^{-1}.$$

This represents a filtering of the force field to remove high frequency components with the type and degree of filtering depending on the stiffness of the springs and the duration of the time step. For low stiffness springs or small time steps, the transfer function of the filter approaches that of a Dirac delta function, which means that a mass point translates independently of its neighbors. For high stiffness springs or large duration time steps, the transfer function of the filter approaches that of a constant value, which means that the mass points all translate together as in rigid body motion.

The third modification involves approximating the matrix H as a constant matrix, computed assuming that the only internal force acting on the object is the linear portion of the force due to springs. Under this assumption, the matrix is defined as follows: $H_{ij}$, where $i \neq j$, equals $k_{ij}$ where $k_{ij}$ is the spring constant for the spring between mass points i and j, and $H_{ii}$ equals $$-\sum_{j \neq i} k_{ij}.$$

This modification avoids the problem of having to compute the matrix H at each step $\Delta t$ over which the object is animated. The matrix H would otherwise have to be computed at each step $\Delta t$ over which animation is performed since it varies with the force field, and the locations of the mass points of the object. That can be seen from the formula for $$\frac{\partial F_{(i,j)}}{\partial x_i}$$

(where $F_{(ij)}$ is the force due to springs between mass points i and j) as follows:

$$-k_{ij} \frac{|x_i - x_j| - l_{ij}^o}{|x_i - x_j|} I_3 + l_{ij}^o \frac{(x_i - x_j)^T (x_i - x_j)}{|x_i - x_j|}$$

The internal force due to springs acting on the object can be split up into a linear force and a non-linear force, where the linear portion of the force, $F_{(i,j)}^{linear}$ can be represented as: $-k_{ij}(x_i - x_j)$, and the non-linear portion of the force, $F_{(i,j)}^{non-linear}$, can be represented as:

$$k_{ij}l_{ij}^0 \frac{(x_i - x_j)}{|x_i - x_j|}.$$

The matrix H for the linear portion of the force is as defined previously: $H_{ij}$, where $i \neq j$, equals $k_{ij}$, where $k_{ij}$ is the spring constant for the spring between mass points i and j, and $H_{ij}$ equals $$-\sum_{j \neq i} k_{ij}.$$

As to the non-linear portion of the force, the absolute value of this force is constant, and only the phase varies over time. Consequently, this force only causes rotation of the object during the time period $\Delta t$. If this rotation is ignored, the matrix H for the non-linear force will be the null matrix since the non-linear force is assumed not to change. Given this assumption, the matrix H for the combined linear and non-linear portions of the force can be taken to be that of the linear force taken alone. Since this matrix is a constant, the computational burden of having to recompute H at each time period $\Delta t$ over which the animation is performed is avoided.

These three modifications represent independent aspects of the invention. Accordingly, the subject invention includes embodiments in which one or any combination of the foregoing modifications are performed. For example, the subject invention includes a modified implicit integration step in which the artificial viscosity term is considered, the matrix H is assumed to be constant, but high frequency filtering of this combined force is either avoided entirely or implicitly performed in one of the other steps. Similarly, the invention includes an embodiment in which high frequency filtering of the internal forces is performed, but the addition of an artificial viscosity term is avoided.

Turning back to FIG. 1, in optional step 2, the new locations of the mass points are corrected in order to compensate, at least in part, for one or more of the approximations made in step 1. In one embodiment, this step comprises correcting the new locations of the mass points as computed in step one in order to preserve angular momentum, thereby achieving more realistic animation. In this embodiment, a correction to conserve linear momentum is not necessary since such is automatically preserved in the implicit integration step. However, such is not the case with angular momentum. This factor is not conserved, particularly in cases involving stiff springs, since the rotation resulting from the non-linear force is ignored in computing H. Fortunately, satisfactory results can be achieved by correcting, in a post implicit integration step, the new locations of the mass points as computed in step 1.

In one embodiment, this step involves first determining the center of gravity of the object, $x_G$, which can be represented as follows:

$$x_G = \frac{\sum_i x_i}{n}.$$

Next, the global torque $\delta T$ is computed in accordance with the following:

$$\delta T = \sum_i F_i^{filtered} \otimes x_i.$$

Thirdly, the new locations of the mass points of the object as determined in step 1 are corrected so that the global torque is 0.

In one implementation, this last substep involves first computing the approximate corrective displacement for each mass point i in accordance with the following: $D_i^{corr} = (x_G - x_i) \otimes \delta T$. Next, the new locations of the object are updated as follows:

$$x_i^{new} = x_i^{new} + D_i^{corr} \frac{dt^2}{m}.$$

In step 3, the new locations of the mass points are optionally further corrected to accommodate high stiffness or long time step conditions. The motivation for this step is the recognition that springs are only an imperfect model for deformable objects. With springs, it is assumed that the elongation is proportional to the force applied. That may result in implausibly large deformations for real world objects. In step 3, a form of constraint enforcement may be applied to ensure that the displacements of the mass points of the object, as determined in the previous two steps, are not too great.

A second embodiment of a method in accordance with the subject invention involves performing the foregoing method steps, but, in addition, further comprises displaying the object as represented by the updated mass points. Advantageously, the method may be repeated over successive time periods of the same or varying duration, thereby achieving animation of the object in real time.

Figure 2:
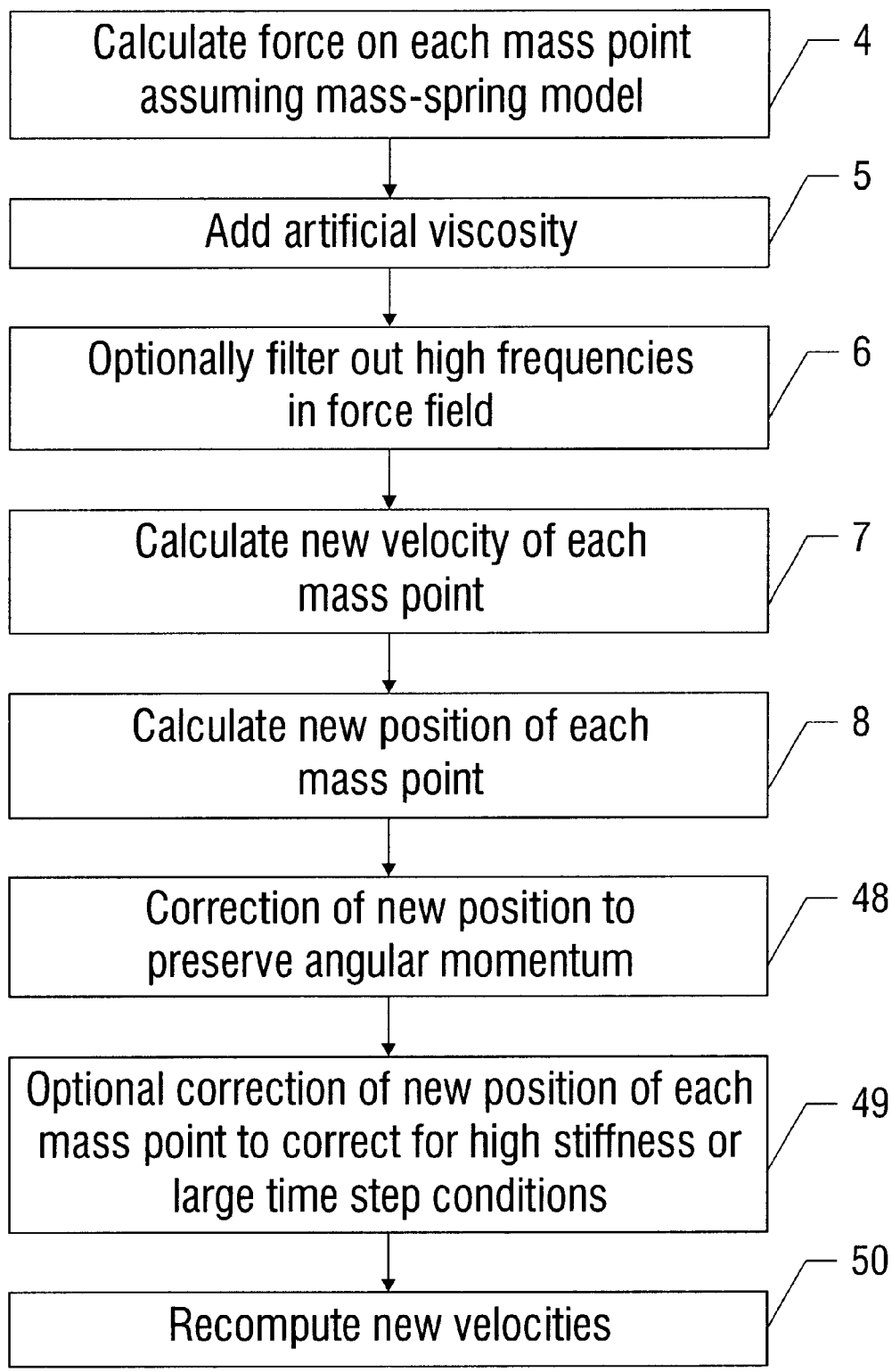
FIG. 2 illustrates an implementation of one embodiment of a method in accordance with the subject invention.
Figure 3A:
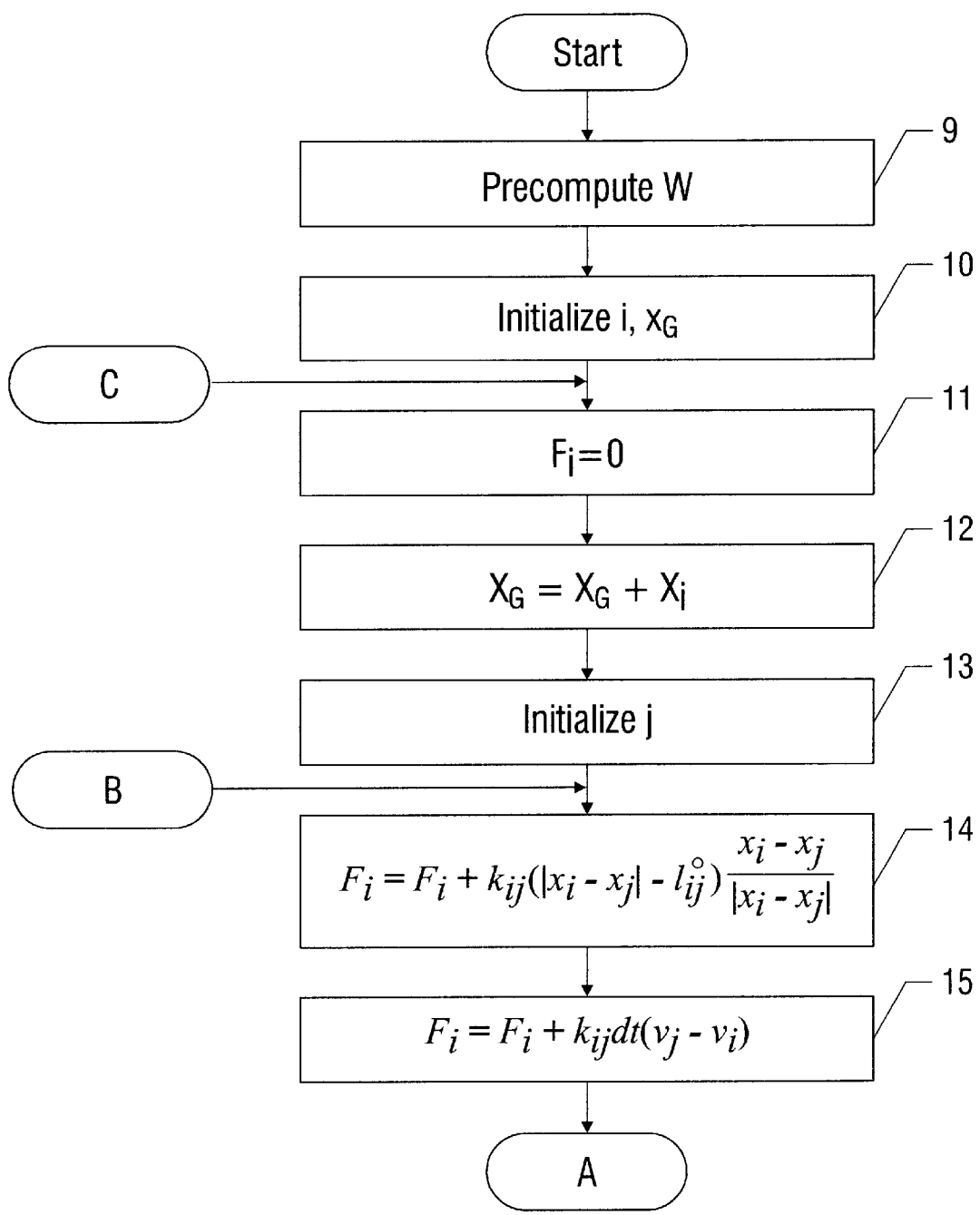
FIGS. 3A–3E illustrate an implementation example of one embodiment of a method in accordance with the subject invention.
Figure 3B:
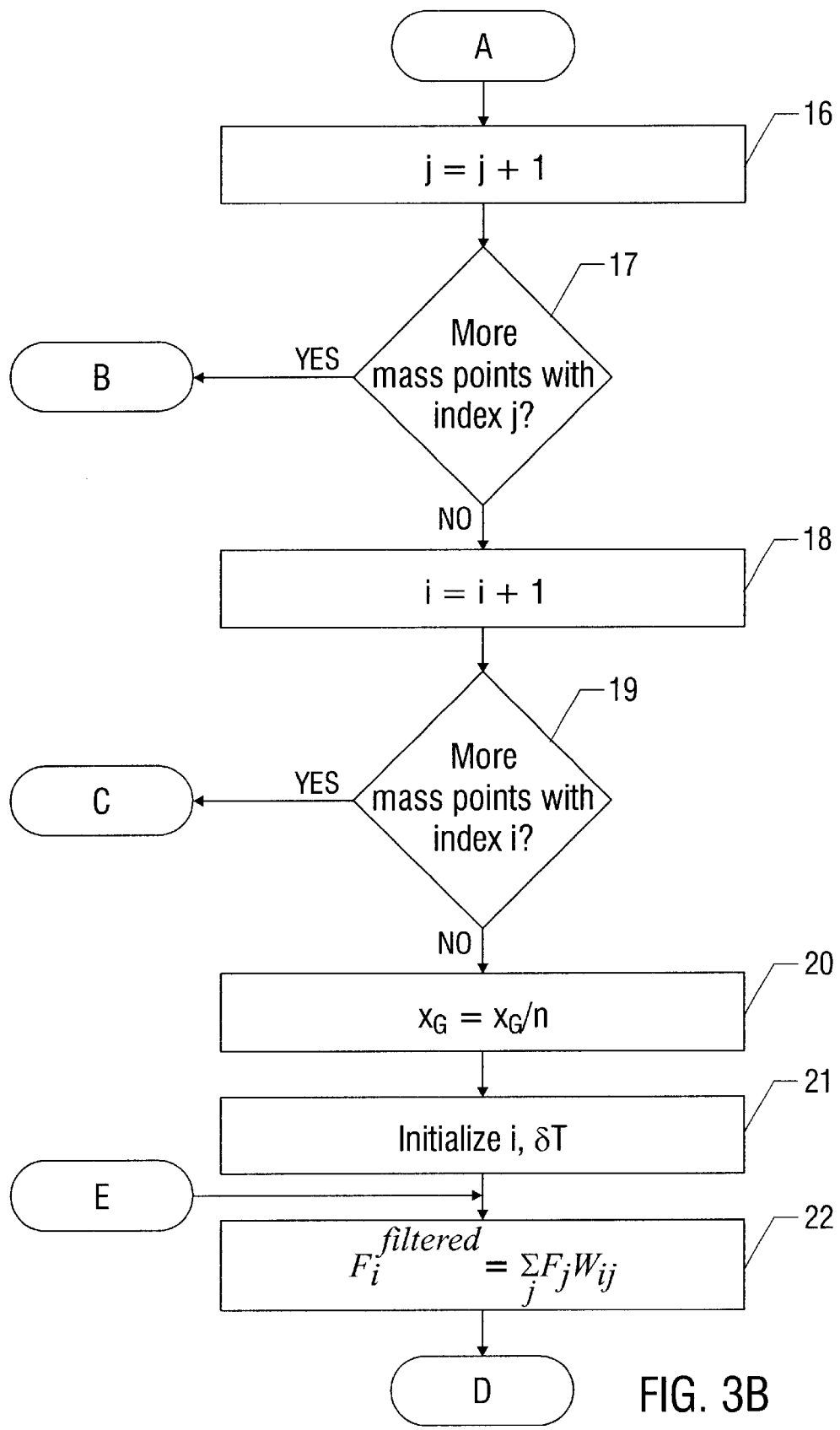
Figure 3C:
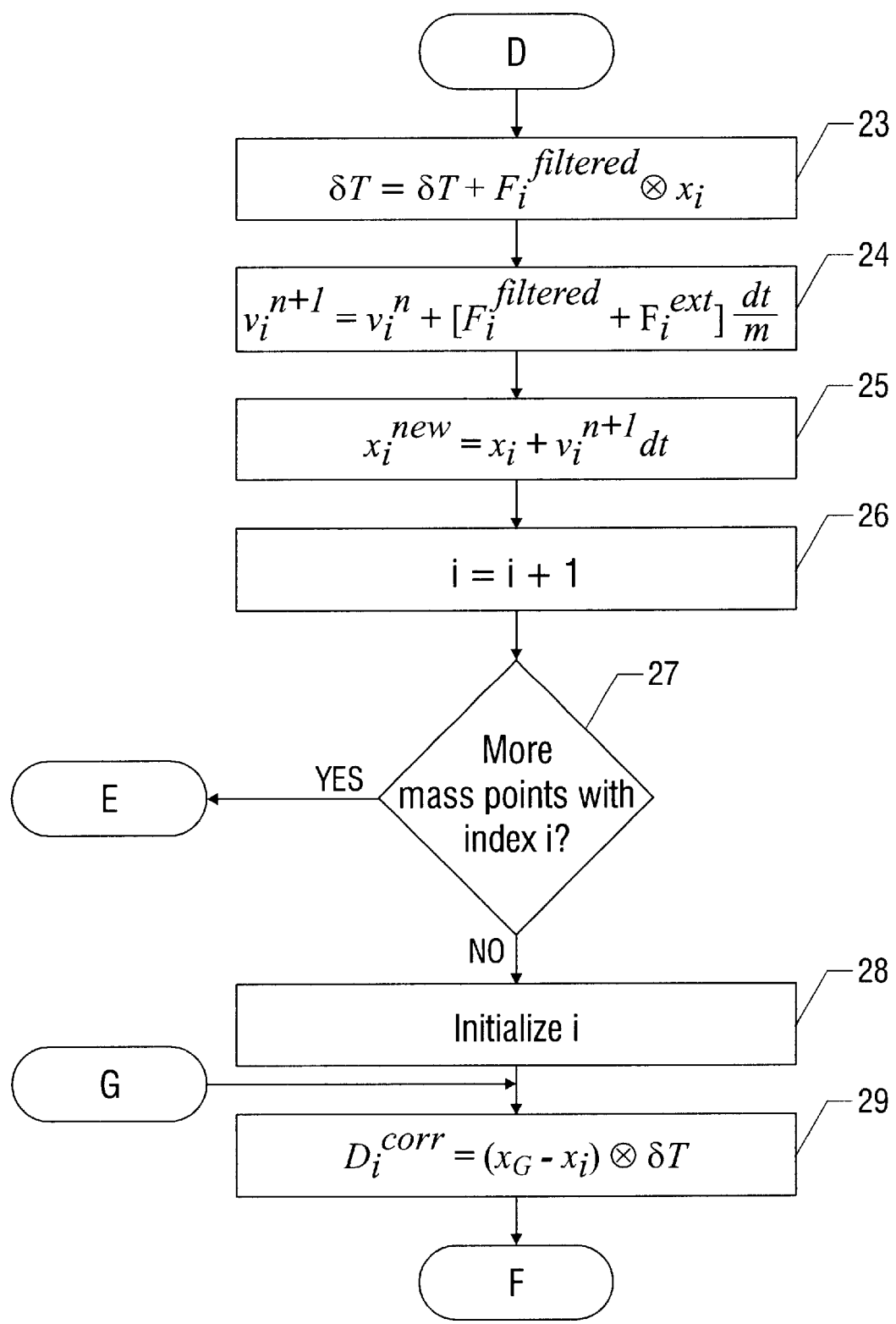
Figure 3D:
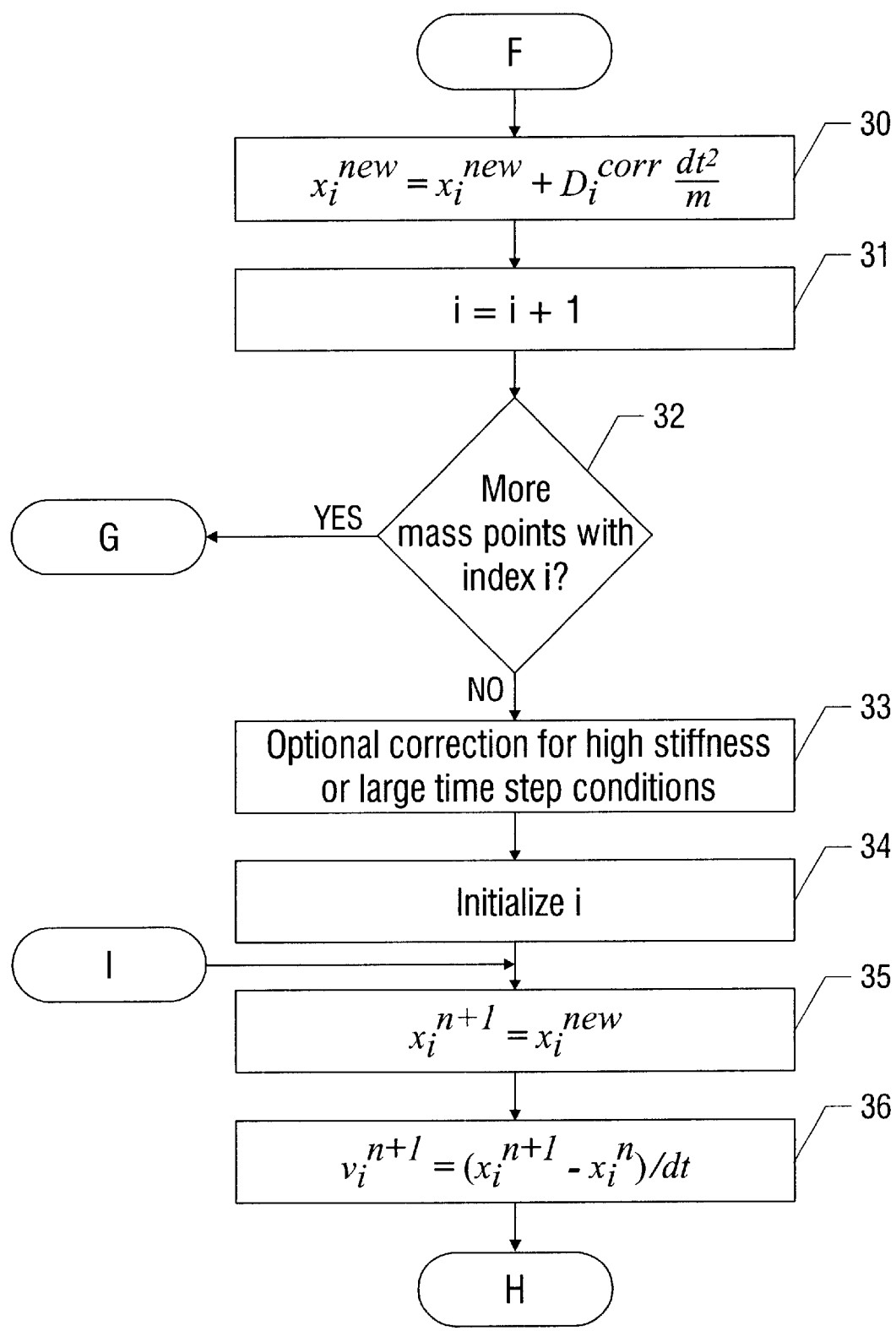
Figure 3E:
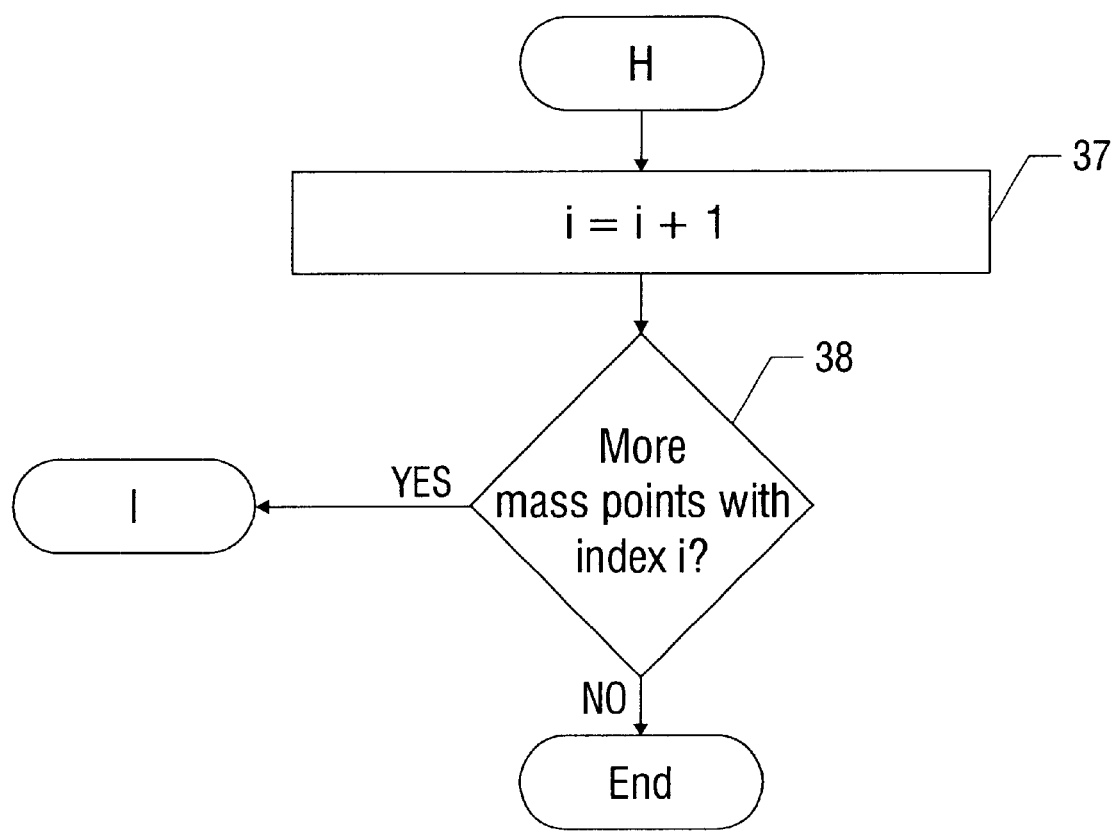

An implementation of a method in accordance with the subject invention is illustrated in FIG. 2. The method begins with step 4, comprising the step of calculating a force field representing the sum of the internal force on each mass point of the object at the beginning of the time period of duration $\Delta t$, assuming the object is represented by a mass-spring model. In one implementation example, for each mass point i, this step can be represented as follows, where the index j represents all the mass points linked to mass point i with a spring:

$$F_i = \sum_j \left[ k_{ij}(|x_i - x_j| - l_{ij}^0) \frac{(x_i - x_j)}{|x_i - x_j|} \right]$$

Next, in step 5, an artificial viscosity term is added to each term of the internal force field to provide a corrected force field. In one implementation, this involves adding to the internal force applied to each mass point i the following term for each of the mass points j connected to mass point i with a spring: $k_{ij}dt(v_j - v_i)$. In one implementation example, this step can be represented as follows:

$$F_i = F_i + \sum_j k_{ij}dt(v_j - v_i)$$

Then, in optional step 6, high frequencies are filtered out from the corrected force field determined in step 5. In one implementation, this step involves pre-computing the constant matrix $$W = \left(I_n - \frac{dt^2}{m}H\right)^{-1},$$

where $H_{ij}$, $i \neq j$, equals $k_{ij}$, and $H_{ii}$ equals $$-\sum_{j \neq i} k_{ij}.$$

Next, this implementation involves computing the filtered force $F_i^{filtered}$ for each mass point i as follows:

$$F_i^{filtered} = \sum_j F_i W_{ij}$$

In step 7, this implementation comprises calculating the new velocity for each mass point i. In this implementation, this step involves, for each mass point i, determining the total force on each mass point due to the filtered force field, and also external factors, such as wind, contact with another object, grasping by a human, etc. Then, this total force is used to compute the new velocity of the object in accordance with the standard implicit integration equation (1) presented earlier. This step can be represented as follows:

$$v_i^{n+1} = v_i^n + \left[F_i^{filtered} + F_i^{ext}\right]\frac{dt}{m}$$

An alternative implementation, applicable in the case in which filtering step 6 is avoided, involves determining the updated velocities from the unfiltered force $F_i$ for each mass point i as determined in step 5.

A second alternate implementation, also applicable in the case in which filtering step 6 is avoided, involves determining the updated velocities from the unfiltered forces in a manner which implicitly filters out one or more high frequencies from the unfiltered forces.

In step 8, the new position for each mass point i is determined from the new velocity of the mass point as determined in step 7. This step may be represented as follows:

$$x_i^{new} = x_i^n + v_i^{n+1} dt$$

In step 48, the new position of each mass point is corrected to preserve angular momentum. In one implementation, this step includes first determining global torque $\delta T$ and the center of gravity $x_G$ as follows:

$$\delta T = \sum_i \left(F_i^{filtered} \otimes x_i\right)$$

$$x_G = \frac{\sum_i x_i}{n}$$

Then, it includes determining the corrective displacement which needs to be applied to each of the mass points i in order to compensate for the non-zero global torque. This substep can be represented as follows:

$$D_i^{corr} = (x_G - x_i) \otimes \delta T$$

Finally, this step includes the substep of correcting the new location of each mass point as determined in step 8. This substep can be represented as follows:

$$x_i^{new} = x_i^{new} + D_i^{corr}\frac{dt^2}{m}$$

Next, optional step 49 is performed. As previously discussed, this optional step involves iteratively correcting the new locations of the mass points as determined in step 48 in order to more accurately model the elongation characteristics of real world objects. In one implementation, this step proceeds until (1) none of the pairs of mass points connected by springs are extended by an excessive amount; (2) a predetermined limit on the number of iterations is equaled or exceeded; or (3) a predetermined time limit for this step is equaled or exceeded.

In one implementation example, this step is performed by iterating through all or substantially all of the pairs of mass points joined by a spring, and checking to see if the spring length $l_{ij}$ between mass points i and j exceeds the rest length, $l_{ij}^0$, by a predetermined maximum amount such as, for example, 10%. If this condition is present, the two mass points are moved closer together in equal measures until the distance between the two equals the rest length plus the predetermined maximum amount. The only exception to this remedy is if movement of one of the mass points is constrained in some way, such as if it is being held for example. In this case, the unconstrained mass point is moved closer to the constrained mass point until the length between the two is at the predetermined maximum.

In this implementation example, this process continues to iterate until one of the following three conditions are present. First, the distance between none of the mass point pairs exceeds the predetermined maximum. Second, the number of iterations equals or exceeds a predetermined maximum number of iterations. Third, a predetermined maximum time limit is equaled or exceeded.

Further information regarding aspects of this step are available in "Deformation constraints in a mass-spring model to describe rigid cloth behavior," X. Provot, Graphics Interface, pp. 147–154, June 1995, which is hereby fully incorporated by reference herein as though set forth in full.

An implementation example of a method in accordance with the subject invention is illustrated in FIGS. 3A–3E.

In step 9, the matrix W is precomputed in accordance with the following:

$$W = \left(I_n - \frac{dt^2}{m}H\right)^{-1}$$

where $I_n$ is the n×n identity matrix, $\Delta t$ is the duration of the time period over which the implicit integration is being performed, m is the mass of a single mass point, and H is the an n×n marix in which n is the number of mass points in the matrix, and $H_{ij}$, an element of the matrix where $i \neq j$, is equal to $k_{ij}$ where $k_{ij}$ is the spring constant for the spring between the ith and jth mass points of the object, and $H_{ij}$ is equal to $$-\sum_{j \neq i} k_{ij}.$$

This latter term is the negative of the sum of the spring constants for all mass points connected to mass point i with a spring. Step 9 is followed by step 10, in which an index i and a variable $x_G$ are initialized to 0.

Steps 11–19 are then performed. In step 11, the variable $F_i$ is set to 0. Step 11 is followed by step 12, in which the value $x_i$ is added to $x_G$, and the result then replaces $x_G$. Step 12 is followed by step 13 in which the index j is initialized to 0. Step 14 is then performed. In step 14, the variable $F_i$ is updated in accordance with the following:

$$F_i = F_i + k_{ij}(|x_i - x_j| - l_{ij}^0)\frac{x_i - x_j}{|x_i - x_j|}$$

In the foregoing, $F_i$ is the internal force on mass point i due to the action of springs, $k_{ij}$ is the spring constant for the spring between mass points i and j, $x_i$ is the vector representing the location of mass point i, $x_j$ is the vector representing the location of mass point j, $l_{ij}^0$ is the rest length of the spring between mass points i and j, and dt is the duration of the time step over which the implied integration step is being performed.

Step 14 is followed by step 15. In step 15, the variable $F_i$ is updated with an artificial viscosity term as follows:

$$F_i = F_i + k_{ij} dt(v_j - v_i)$$

Step 15 is followed by step 16 in which the index j is incremented by 1.

Step 16 is followed by step 17 in which a query is made whether the index j exceeds n, the number of mass points in the object. If not, a jump is made to step 14, whereupon steps 14–17 are repeated. If so, step 18 is performed. In step 18, the index i is incremented by 1. Step 18 is followed by step 19, in which a query is made whether the index i exceeds n, the number of mass points in the object. If not, a jump is made to step 11, whereupon steps 11–19 are repeated. If so, step 20 is performed.

Steps 11–19 can be represented by the following pseudo-code:

For each mass point i $$F_i = 0$$

For each mass point j linked to mass point i with a spring $$F_i = F_i + k_{ij}(|x_i - x_j| - l_0^{ij})\frac{x_i - x_j}{|x_i - x_j|}$$

$$F_i = F_i + k_{ij} dt(v_j - v_i)$$

In step 20, the variable $x_G$ is updated as follows:

$$x_G = x_G / n$$

At this point, $x_G$ represents the center of mass of the object.

Step 20 is followed by step 21, in which the index i is re-initialized to 0, and the variable $\delta T$ is initialized to 0. Step 21 is followed by step 22, in which the variable $F_i^{filtered}$ is computed in accordance with the following expression:

$$F_i^{filtered} = \sum_j F_j W_{ij}$$

In the foregoing, $F_j$ is the force on mass point j computed in the previous loop of pseudo-code, $W_{ij}$ is the element of matrix W located at the intersection of the ith row and jth column, and $F_i^{ext}$ is the external force exerted on mass point i, m is the mass of a mass point. This step represents high frequency filtering of the force field using the matrix W.

Step 22 is followed by step 23, in which the variable $\delta T$ is updated in accordance with the following expression:

$$\delta T = \delta T + F_i^{filtered} \otimes x_i$$

In this step, $\delta T$ represents global torque.

Step 23 is followed by step 24 in which the external force on a mass point, $F_i^{ext}$ is added to the filtered internal force on the mass point, $F_i^{filtered}$. The combined force is then used to compute the new velocity $v_i^{n+1}$ for the mass point in accordance with the following expression:

$$v_i^{n+1} = v_i^n + [F_i^{filtered} + F_i^{ext}]\frac{dt}{m}$$

Step 24 is followed by step 25 in which the new location of a mass point, $x_i^{new}$, is computed in accordance with the following expression:

$$x_i^{new} = x_i + v_i^{n+1} dt$$

Step 26 is then performed in which the index i is incremented by 1. Step 26 is followed by step 27 in which the index i is compared with n, the number of mass points in the object. If the index does not exceed n, a jump is made to step 22, whereupon steps 22–27 are repeated. If the index exceeds n, step 28 is performed.

In this implementation example, steps 22–27 can be represented by the following pseudo-code:

For each mass point i $$F_i^{filtered} = \sum_j F_j W_{ij}$$

$$v_i^{n+1} = v_i^n + [F_i^{filtered} + F_i^{ext}]\frac{dt}{m}$$

$$x_i^{new} = x_i + v_i^{n+1} dt$$

In step 28, the index i is reinitialized to 0. Step 28 is followed by step 29 in which a corrective displacement $D_i^{corr}$ is computed for each of the mass points in accordance with the following expression:

$$D_i^{corr} = (x_G - x_i) \otimes \delta T$$

Step 29 is followed by step 30 in which the new location of a mass point as determined in step 25 is updated in accordance with the corrective displacement $D_i^{corr}$. The following expression describes this process:

$$x_i^{new} = x_i^{new} + D_i^{corr}\frac{dt^2}{m}$$

Step 30 is followed by step 31 in which the index i is incremented by 1. Step 32 is then performed. In step 32, a query is made whether the index i exceeds n, the number of mass points in the object. If not, a jump is made to step 29, whereupon steps 29–32 are repeated. If so, a jump is made to step 33.

Steps 28–32 can be represented by the following pseudo-code:

For each index point i $$D_i^{corr} = (x_G - x_i) \otimes \delta T$$

$$x_i^{new} = x_i^{new} + D_i^{corr}\frac{dt^2}{m}$$

Next, in step 33, an optional correction step is performed to accommodate cases involving high stiffness or large time period conditions. This optional step has been adequately described in the previous sections.

Step 34 is then performed. In step 34, the index is re-initialized to 0. Step 34 is followed by step 35, in which the variable $x_i^{n+1}$ is updated by setting it equal to $x_i^{new}$. Step 35 is followed by step 34 in which the variable $v_i^{n+1}$ is updated based on $x_i^{n+1}$. This step can be represented by the following expression:

$$v_i^{n+1} = (x_i^{n+1} - x_i^n)/dt$$

Step 35 is followed by step 36 in which the index i is incremented by 1. Next, step 38 is performed. In step 38, a query is made whether the index i exceeds n, the number of mass points in the object. If not, a jump is made to step 35, whereupon steps 35–38 are repeated. If so, the process ends.

Steps 34–38 can be represented by the following pseudo-code:

For each mass point i $$x_i^{n+1} = x_i^{new}$$

$$v_i^{n+1} = (x_i^{n+1} - x_i^n)/dt$$

The entirety of the implementation example of FIGS. 3A–3E can be represented by the following pseudo-code:

$$\text{Precompute } W = \left(I_n - \frac{dt^2}{m}H\right)^{-1}$$

At each time step dt
//Compute internal forces $F_i$
//due to springs and artificial viscosity $$x_G = 0$$

For each mass point i $$F_i = 0$$

$$x_G = x_G + x_i$$

For each mass point j linked to mass point i with a spring $$F_i = F_i + k_{ij}(|x_i - x_j| - l_{ij}^0)\frac{x_i - x_j}{|x_i - x_j|}$$

$$F_i = F_i + k_{ij}dt(v_j - v_i)$$

$$x_G = x_G/n$$

$$\delta T = 0$$

//High frequency filtering
For each mass point i $$F_i^{filtered} = \sum_j F_j W_{ij}$$

$$\delta T = \delta T + F_i^{filtered} \otimes x_i$$

$$v_i^{n+1} = v_i^n + [F_i^{filtered} + F_i^{ext}]\frac{dt}{m}$$

//Post correction of angular momentum
For each mass point i $$D_i^{corr} = (x_G - x_i) \otimes \delta T$$

$$x_i^{new} = x_i^{new} + D_i^{corr}\frac{dt^2}{m}$$

//Now, do post correction for high stiffness or large time
//period cases nbIter=0 do
   Eliminate conditions in which mass points separated by
     springs are displaced from one another by excessive
     amount
until (error<ε) or (nbIter>nbIterMax) or (time is up!)
//Update new position and velocity
For each mass point i $$x_i^{n+1} = x_i^{new}$$

$$v_i^{n+1} = (x_i^{n+1} - x_i^n)/dt$$

Figure 4:
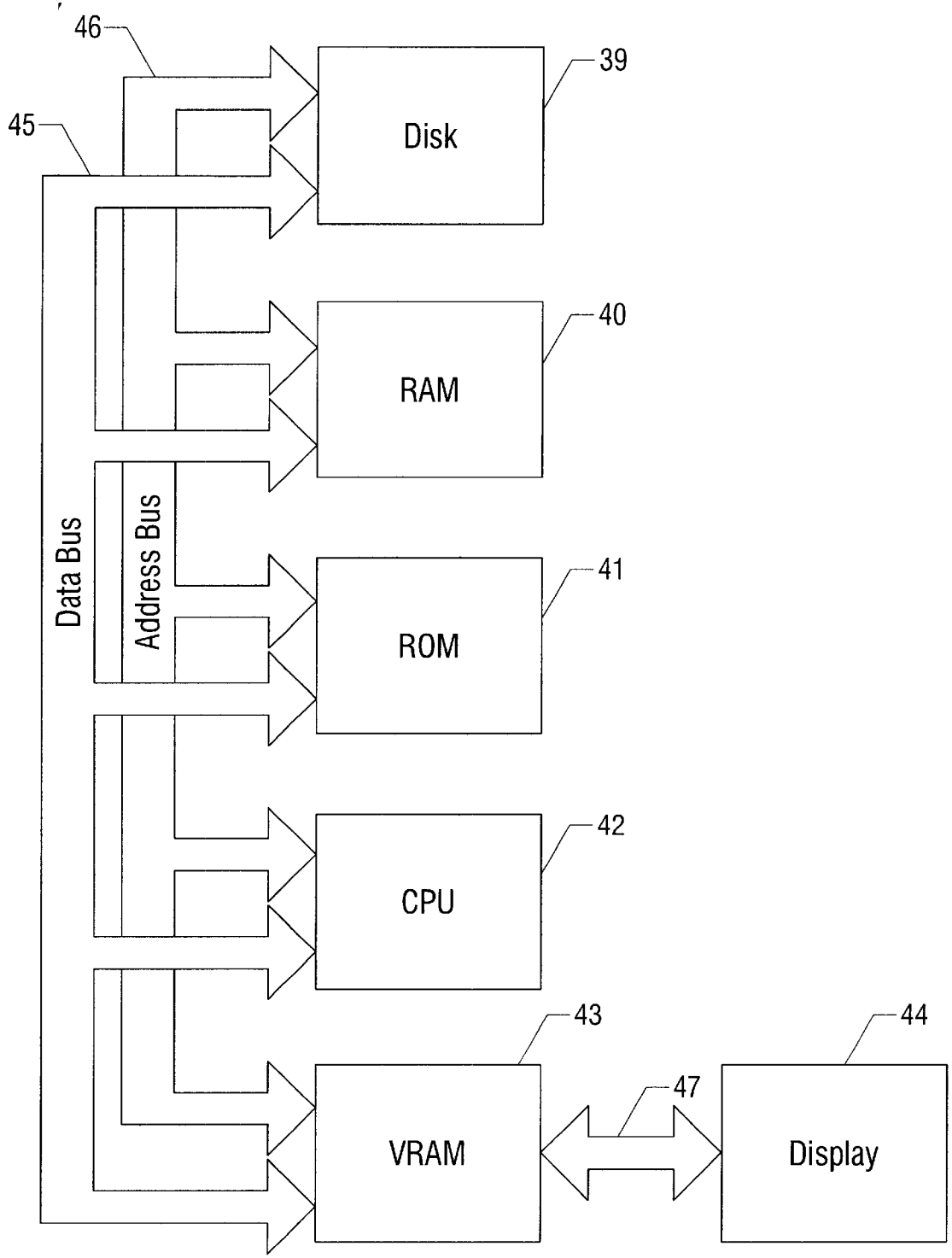
FIG. 4 illustrates one embodiment of a processor-based system in accordance with the subject invention.

FIG. 4 illustrates one embodiment of a system for animating two- or three-dimensional deformable objects in real-time in accordance with the subject invention. As illustrated, the system includes CPU 42 which can be any processor, including but not limited to a microprocessor, capable of executing software instructions stored in a memory, storage device or medium accessible or readable by the processor. CPU 42 is coupled to one or more memories, storage devices or media, including by way of illustration only and not limitation, Disk 39, RAM 40, ROM 41, and VRAM 43, through Address Bus 46 and Data Bus 45. In addition, VRAM 43 is coupled to Display 44 through Video Bus 47. In this embodiment, Disk 39 functions as archival storage, RAM (Random Access Memory) 40 functions as volatile temporary storage, ROM (Read Only Memory) 41 functions as non-volatile storage, and VRAM (video RAM) 43 functions as pixel-mapping memory for Display 44. By way of illustration only, and not limitation, Disk 39 may be a hard disk, floppy disk, or compact disk.

In one configuration, software, comprising of series of instructions embodying any of the methods of the subject invention, is stored in Disk 39. When the system is booted up, the software is loaded into RAM 40. A section of RAM 40 is also allocated to the storage of the locations of the mass points of the object to be animated. CPU 42 accesses this software as stored in RAM 40, and executes it to update the locations, also in RAM 40, of the mass points of an object at successive time intervals of duration Δt or of non-uniform duration. CPU 42 also updates the pixels in VRAM 43 at the successive time intervals in accordance with the new locations of the mass points of the object. The updated pixels are displayed on Display 44. Preferably, this process takes place in real time. The result is real-time animation of the object.

In another configuration, the software embodying a method in accordance with the subject invention is stored in ROM 41. A section of RAM 40 is allocated to the storage of the locations of the mass points of the object to be animated. CPU 42 accesses the software as stored in ROM 41, and executes it to update the locations, stored in RAM 40, of the mass points of an object at successive time intervals of duration Δt or of non-uniform duration. CPU 42 also updates the pixels in VRAM 43 at successive time intervals in accordance with the new locations of the mass points of the object. The updated pixels are displayed on Display 44. Again, this process preferably takes place in real time. Consequently, real-time animation of the object is achieved.

Figure 5:
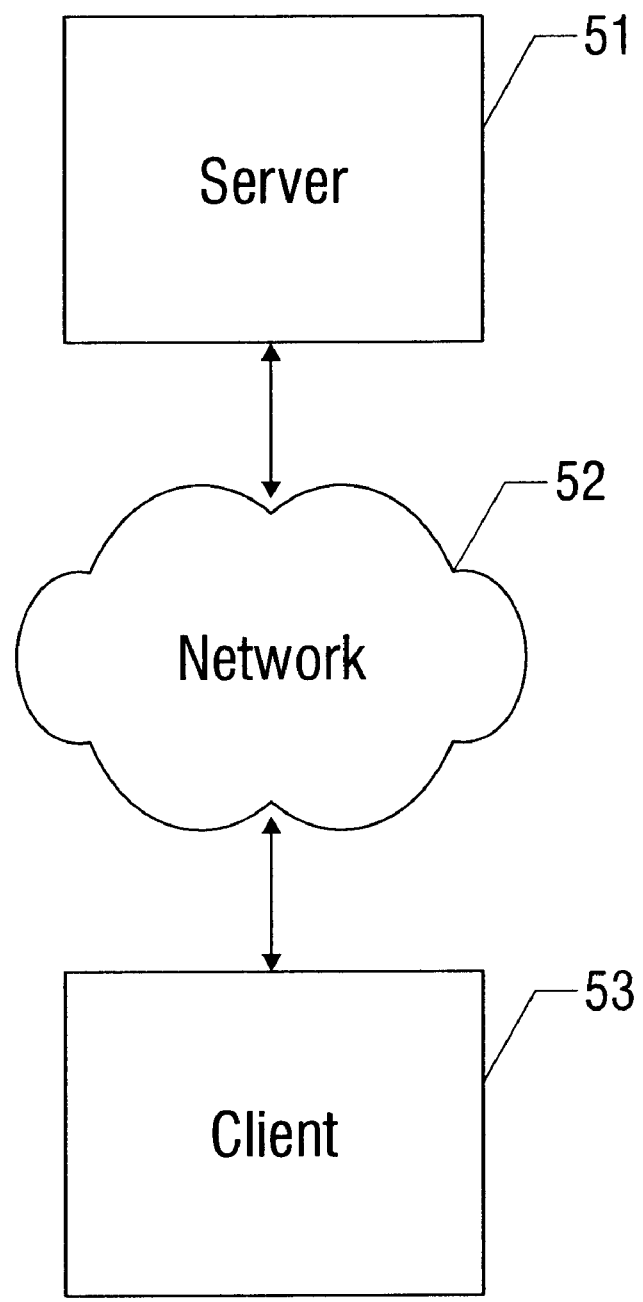
FIG. 5 illustrates one embodiment of a client-server architecture in accordance with the subject invention.

FIG. 5 illustrates a second embodiment of a system for animating two- or three-dimensional objects in real time in accordance with the subject invention. In this embodiment, a client-server architecture is employed in which a client 53 accesses a server 51 over a network 52, which may be proprietary network or a public network such as the Internet which utilizes a standardized communications protocol such as TCP/IP. In one embodiment, software embodying a method in accordance with the subject invention is maintained on server 51. Client 53 issues a request to animate an object in real-time, and this spawns a request to access the software maintained on server 51. In one configuration, to eliminate excessive latency, the software is then copied to client 53 whereupon it is executed. In order to customize the animation to a particular user, the client 53 may also provide the software with user-specific information about the object to be animated. In another configuration, assuming latency is not a problem, the software is remotely executed on server 51. In this configuration, the server 51 successively provides the client 53 with updated locations of the mass points of the object for display of pixels representative thereof at the client site. In a third configuration, the software is downloaded from server 51 to a second server (not shown) which is local to client 53 or at least accessible by the client 53 without undue latency. The software may then be executed by this second server. As the software executes, the second server may then successively provide the client with updated locations of the mass points of the object for display of pixels representative thereof at the client site. Hence, again, real-time animation of the object is achieved.

While embodiments, implementations, and implementation examples have been shown and described, it should be apparent that there are many more embodiments, implementations, and implementation examples that are within the scope of the subject invention. Accordingly, the scope of the subject invention is not to be restricted except in light of the appended claims and their equivalents.

What is claimed is:

1. For a two- or three-dimensional object represented by a plurality of mass points interconnected by a mass spring system, each of the mass points having a location and a velocity, a method of updating the locations and velocities of the mass points to reflect passage of a time period of duration Δt, the method comprising the following steps:

determining an internal force on each mass point due to springs;

filtering out one or more high frequencies from the resultant forces;

determining updated velocities for each of the mass points responsive to the filtered forces and any applicable external forces; and determining updated locations for each of the mass points responsive to the updated velocities.

2. The method of claim 1 further comprising adding an artificial viscosity term to at least one of the internal forces prior to the filtering step.

3. The method of claim 1 further comprising correcting the updated locations to preserve at least in part angular momentum.

4. The method of claim 1 further comprising pre-computing a matrix W which equals $$\left(I_n - \frac{\Delta t^2}{m} H\right)^{-1},$$

where n is the number of mass points in the object, $I_n$ is the n×n identity matrix, m is the mass of a mass point, and H is a matrix such that $H_{ij}$, where i≠j, equals $k_{ij}$, a spring constant for a spring between mass points i and j, and $H_{ij}$ equals $$-\sum_{j \neq i} k_{ij}.$$

5. The method of claim 1 wherein said first determining step comprises computing, for each mass point i, $F_i$, the internal force on the mass point due to springs, in accordance with the following:

$$F_i = \sum_j k_{ij}(|x_i - x_j| - l_{ij}^0)x_i - \frac{x_j}{|x_i - x_j|},$$

where the summation takes place for each mass point j connected to mass point i with a spring, $k_{ij}$ is the spring constant for the spring between mass points i and j, $x_i$ and $x_j$ are the current locations respectively of mass points i and j, and $l_{ij}^0$ is the rest length of the spring between mass points i and j.

6. The method of claim 2 wherein said adding step comprises, for each mass point i, adding to $F_i$, the internal force on the mass point due to springs, an artificial viscosity term equal to $$\sum_j k_{ij}\Delta t(v_j - v_i),$$

where the summation is performed for each mass point j connected to mass point i with a spring, $k_{ij}$ is the spring constant for the spring between mass points i and j, and $v_i$ and $v_j$ are respectively the current velocities of the mass points i and j.

7. The method of claim 4 wherein the filtering step comprises, for each mass point i, determining $F_i^{filtered}$, the filtered internal force due to springs and viscosity, in accordance with the following:

$$F_i^{filtered} = \sum_j F_j W_{ij}.$$

8. The method of claim 7 wherein the second determining step comprises determining, for each mass point i, an updated velocity, $v_i^{n+1}$, in accordance with the following:

$$v_i^{n+1} = v_i^n + \left[F_i^{filtered} + F_i^{ext}\right]\frac{\Delta t}{m},$$

where $v_i^n$ is the current velocity of mass point i, $F_i^{ext}$ is any external force which may be applied to mass point i, and m is the mass of a mass point.

9. The method of claim 8 wherein the third determining step comprises determining, for each mass point i, an updated location, $x_i^{new}$ in accordance with the following:

$x_i^{new} = x_i^n + v_i^{n+1}\Delta t$, where $x_i^n$ is the current location of mass point i.

10. The method of claim 3 wherein the correcting step comprises the following substeps:

computing global torque, $\delta T$, in accordance with the following:

$$\delta T = \sum_i \left( F_i^{filtered} \otimes x_i^n \right)$$

determining a center of gravity, $x_G$, in accordance with the following:

$$x_G = \sum_i x_i^n / n$$

for each mass point i, determining a corrective displacement, $D_i^{corr}$, in accordance with the following:

$$D_i^{corr} = (x_G - x_i^n) \otimes \delta T$$

for each mass point, updating the new location thereof, $x_i^{n+1}$ in accordance with the following:

$$x_i^{n+1} = x_i^{n+1} + D_i^{corr} \frac{\Delta t^2}{m}.$$

11. The method of claim 1 further comprising post-correcting at least one of the updated locations of the mass points in order to eliminate an excessive length condition between at least one pair of the mass points connected by a spring.

12. The method of claim 11 further comprising post-correcting, for at least one mass point i, the updated velocity $v_i^{n+1}$ in accordance with the following:

$$v_i^{n+1} = (x_i^{n+1} - x_i^n) / \Delta t.$$

13. The method of claim 11 wherein, for a pair of mass points i and j connected by a spring having a rest length $l_{ij}^0$, an excessive length condition exists when the distance between the pair of mass points exceeds the rest length $l_{ij}^0$ by a predetermined amount.

14. The method of claim 1 further comprising displaying the object as represented by the updated mass points.

15. For a two- or three-dimensional object represented by a plurality of mass points interconnected by a mass spring system, each of the mass points having a location and a velocity, a method of updating the locations and velocities of the mass points to reflect passage of a time period of duration $\Delta t$, the method comprising the following steps:

determining an internal force on each mass point due to springs;

adding an artificial viscosity term to at least one of the internal forces;

determining updated velocities for each of the mass points responsive to forces derived from the internal forces and any applicable external forces; and determining updated locations for each of the mass points responsive to the updated velocities.

16. The method of claim 15 further comprising correcting the updated locations to preserve at least in part angular momentum.

17. The method of claim 15 wherein said second determining step includes determining the updated velocities to at least in part implicitly filter out high frequencies from the internal forces.

18. The method of claim 15 further comprising filtering, prior to the second determining step, one or more high frequencies from the forces resulting from adding the artificial viscosity terms to the internal forces.

19. The method of claim 15 further comprising displaying the object as represented by the updated mass points.

20. For a two- or three-dimensional object represented by a plurality of mass points interconnected by a mass spring system, each of the mass points having a location and a velocity, a method of updating the locations and velocities of the mass points to reflect passage of a time period of duration $\Delta t$, the method comprising the following steps:

determining an internal force on each mass point due to springs;

filtering out one or more high frequencies from the resultant forces;

determining updated velocities for each of the mass points responsive to the filtered forces and any applicable external forces;

determining updated locations for each of the mass points responsive to the updated velocities; and correcting the updated locations to preserve at least in part angular momentum.

21. The method of claim 20 further comprising adding an artificial viscosity term to at least one of the internal forces prior to the filtering step.

22. The method of claim 20 wherein the filtering step comprises, for each mass point i, determining $F_i^{filtered}$, the filtered internal force due to springs in accordance with the following:

$$F_i^{filtered} = \sum_j F_j W_{ij}$$

where W is a pre-computed constant matrix which equals $$\left( I_n - \frac{\Delta t^2}{m} H \right)^{-1},$$

where n is the number of mass points in the object, $I_n$ is the n×n identity matrix, m is the mass of a mass point, and H is a matrix such that $H_{ij}$, where i≠j, equals $k_{ij}$, a spring constant for a spring between mass points i and j, and $H_{ij}$ equals $$-\sum_{j \neq i} k_{ij}.$$

23. A processor readable medium for tangibly embodying a series of instructions for performing the method steps of any of claims 1, 15, and 20.

24. The medium of claim 23 which is selected from the group comprising a disk, RAM, ROM, and VRAM.

25. The medium of claim 23 which is selected from the group comprising a hard disk, a floppy disk, and a compact disk.

26. A server capable of being accessed by a client over a computer network for tangibly embodying a series of instructions for performing the method steps of any of claims 1, 15, and 20.

27. A system comprising the server of claim 26 in combination with a client for accessing the server over a computer network.

28. The system of claim 27 wherein the computer network is a proprietary network.

29. The system of claim 27 wherein the computer network is the Internet.

30. A system comprising the medium of claim 23 in combination with a processor capable of accessing the medium over a bus.

31. A processor readable medium in which is stored the updated locations produced by any of the methods of claims 1, 3, 10, 11, 15, 16, 20, and 21.

32. For a two- or three-dimensional object represented by a plurality of mass points interconnected by a mass spring system, each of the mass points having a location and a velocity, a method of updating the locations and velocities of the mass points to reflect passage of a time period of duration $\Delta t$, the method comprising the following steps:

- a step for determining an internal force on each mass point due to springs;
- a step for filtering out one or more high frequencies from the resultant forces;
- a step for determining updated velocities for each of the mass points responsive to the filtered forces and any applicable external forces; and
- a step for determining updated locations for each of the mass points responsive to the updated velocities.

* * * * *